United States Patent [19]

Ekhoff

[11] Patent Number: 5,048,005
[45] Date of Patent: Sep. 10, 1991

[54] SPINDLE CLAMP HAVING A UNITARY LOCK MEMBER

[76] Inventor: Donald L. Ekhoff, 2600 Day Rd., Gilroy, Calif. 95020

[21] Appl. No.: 419,039

[22] Filed: Oct. 10, 1989

[51] Int. Cl.$^5$ .................. G11B 23/00; G11B 25/00
[52] U.S. Cl. .................... 369/270; 369/271; 360/99.04; 360/99.05; 360/99.12
[58] Field of Search ................ 369/270, 271; 360/99.04, 99.05

[56] References Cited

U.S. PATENT DOCUMENTS

| | | | |
|---|---|---|---|
| 4,022,478 | 5/1977 | Stewart | 369/270 X |
| 4,125,883 | 11/1978 | Rolph | 360/99 |
| 4,171,531 | 10/1979 | Grapes et al. | 360/99 |
| 4,232,870 | 11/1980 | Iemenschot | 274/39 |
| 4,376,997 | 3/1983 | Eggers | 369/270 |
| 4,541,086 | 9/1985 | Tanaka | 369/271 |
| 4,705,279 | 11/1987 | Mizukami et al. | 369/271 X |
| 4,755,981 | 7/1988 | Ekhoff | 369/270 |
| 4,787,079 | 11/1988 | Ueno | 369/270 |
| 4,958,839 | 9/1990 | Guzik et al. | 369/271 X |

FOREIGN PATENT DOCUMENTS

| | | | |
|---|---|---|---|
| 60-150261 | 8/1985 | Japan | 369/270 |
| 60-237672 | 11/1985 | Japan | 369/271 |
| 60-239961 | 11/1985 | Japan | |
| 61-214272 | 9/1986 | Japan | 369/271 |
| 61-240472 | 10/1986 | Japan | |
| 62-212957 | 9/1987 | Japan | 369/270 |
| 63-136353 | 6/1988 | Japan | 369/270 |

Primary Examiner—Stuart S. Levy
Assistant Examiner—Kenneth B. Wells
Attorney, Agent, or Firm—Schneck & McHugh

[57] ABSTRACT

A spindle clamp for suppporting a data disk, wherein the spindle clamp includes a hub mounted for rotation about a central axis. The upper portion of the hub has a frustroconically-shaped bearing surface and has a disk-seating surface at the base of the bearing surface. A lock member has a downwardly-depending portion which is axially mounted such that the lower extremity of the lock member contacts the frustroconically-shaped bearing surface. The lock member is a unitary, cup-shaped member made of an elastically flexible material and preferably includes a plurality of axially-arranged fingers. Pneumatic or mechanical actuation of a piston within the hub is translated to the lock member to cause movement from a disk-releasing position to a disk-clamping position. Downward movement of the piston draws the lower extremities of the fingers along the bearing surface of the hub until the lock member reaches the disk-clamping position in which the fingers press a data disk against the disk-seating surface of the hub. A spring is utilized to bias the lock member in the disk-clamping position.

20 Claims, 1 Drawing Sheet

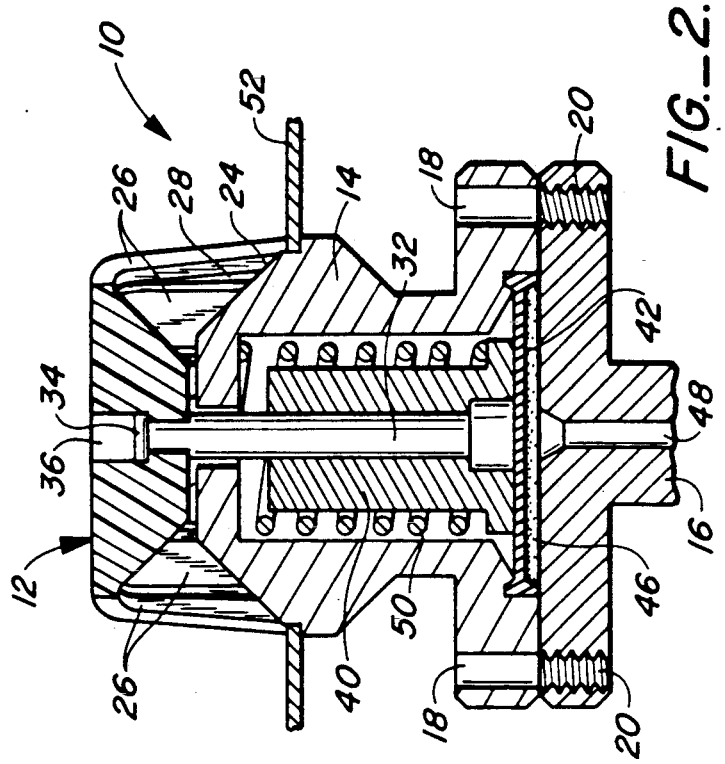
FIG._2.
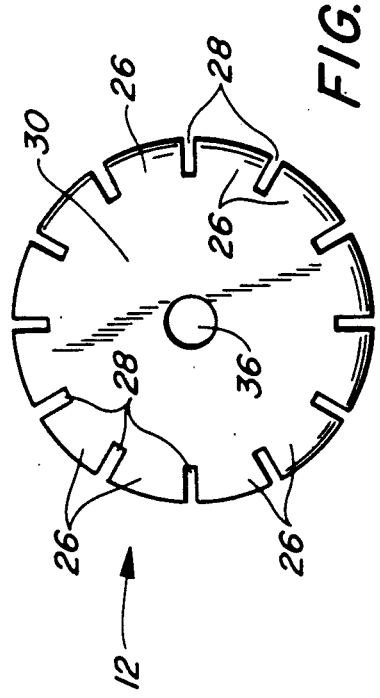
FIG._3.
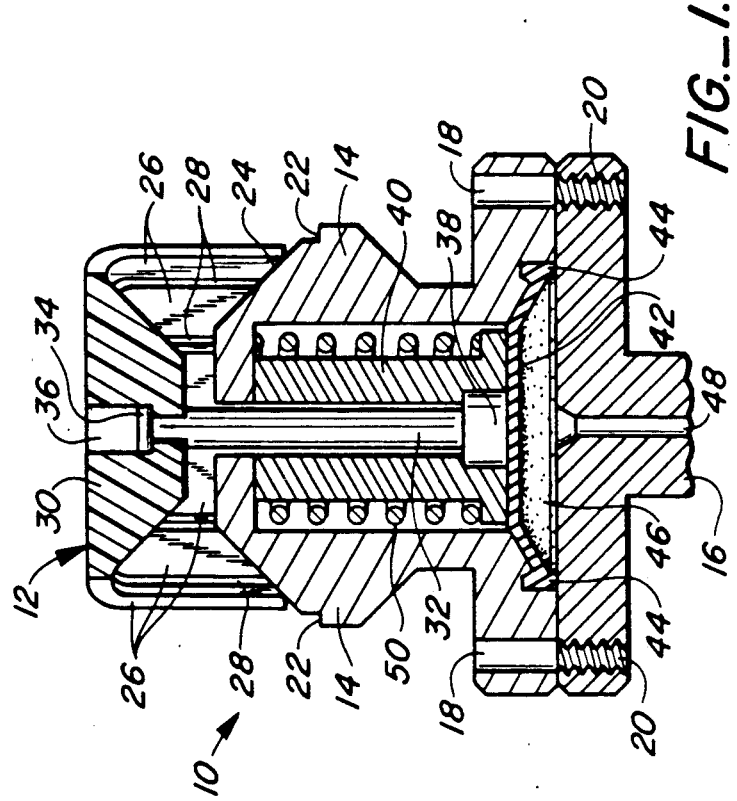
FIG._1.

5,048,005

SPINDLE CLAMP HAVING A UNITARY LOCK MEMBER

TECHNICAL FIELD

The present invention relates to clamping devices adapted for supporting and releasing a disk and in particular to spindle clamps for removably supporting a disk for rotation about an axis.

BACKGROUND ART

In many industrial applications, rapid robotic replacement of a first magnetic data disk or a first optical data disk with a second data disk is an important concern in the design of disk drives. For example, in quality control testing associated with manufacture of magnetic and optical data disks, rapid robotic replacement increases product throughput. Placement of a data disk on a drive involves three aspects—disk introduction, centering and clamping. U.S. Pat. Nos. 4,125,883 to Rolph, 4,232,870 to Iemenschot and 4,171,531 to Grapes et al. disclose devices which both center and clamp recording media disks. The clamping devices include cylindrical members which enter a mounting aperture in the center of a disk from a direction above the disk. The periphery of the cylindrical member frictionally contacts the mounting aperture to center the disk for rotation about a vertical axis.

Because of the associated centrifugal force and because it is desirable to quality test data disk under the same conditions as will be experienced in actual use, top-clamping devices such as those noted above are preferred. Such top-clamping devices, however, require "two-handed" robotics, one hand controlling the top-clamping device and the other handling the disk. This two-handed process increases the expense of the robotic apparatus and increases the time of the robotic disk-replacement procedure.

An even more important consideration in the design of apparatus for clamping data disks involves minimalization of disk distortion. Typically, this distortion is a result of non-uniform loading pressure from a plurality of elements of a clamp device. For example, it is common to employ a plurality of elements, each of which applies a clamping force about the inner portion of the top surface of a loaded data disk. Any variance in manufacturing quality or any undesired deflections can cause wide variances in unit loading pressure. Often, a clamp device is manufactured by machining a single blank and then cutting the blank into a plurality of segments which are spaced apart as the clamp device is pressed onto the inside edge of the data disk. A variation of 0.0001 inch in the thickness of the blank can render a clamp unusable. Because of these exacting tolerances, the sequential order of the blank segments must be maintained throughout the life of the clamp. Moreover, as the segments are pushed onto the top surface of the data disk, there may be a rotation of the segments, in which case only the edges of the segments provide the loading pressure. Such rotation results in an unequal distribution of clamp force applied to only a limited number of pressure regions.

It is an object of the present invention to provide a spindle clamp which applies a substantially even clamping force for securing a magnetic or optical data disk and which permits "one-handed" robotic removal of the disk.

DISCLOSURE OF THE INVENTION

The above object has been met by a spindle clamp which is part of a drive spindle assembly and, yet, which secures a data disk from above the disk by means of a lock member which is a unitary element that is actuated by a hub. The clamping apparatus includes the lock member and the hub. The hub is adapted to be mounted to a conventional spindle, which spindle defines a rotational axis for the hub. The hub has an axial frustroconically-shaped upper portion and a disk-seating surface proximate to the base of the upper portion.

The preferred embodiment of the unitary lock member is referred to as a spider member, having a plurality of downwardly extending legs, or fingers, arranged about a circular center portion. The downwardly-depending portion of the lock member, however, may have a continuous circumference, rather than being divided into a plurality of fingers. The lower end of the lock member contacts the surface of the frustroconically-shaped upper portion of the hub. In a relaxed disk-releasing position, the downwardly-depending portion extends in a vertical direction and the radial extent of the lock member is less than the radial extent of a central aperture of a disk to be clamped.

A piston within the hub is coupled to the lock member such that axial movement of the piston causes downward movement of the lock member from the disk-releasing position. The lock member is made of an elastically flexible material. As the lock member is drawn downwardly, contact of the lower end of the lock member against the inclined surface of the hub causes the lock member to flex. In a disk-clamping position, the lock member presses a disk against the disk-seating surface of the hub. Preferably, the piston is biased so that the lock member is in the disk-clamping position, with force being required to displace the lock member into the disk-releasing position. Thus, the upper circular surface of the lock member and the downwardly depending portion define a cylindrical volume when in a relaxed condition.

Because the lock member is machined of a single unit, the fingers of the preferred embodiment deflect at a substantially uniform rate. Thus, an advantage of the present invention is that there is control over manufacturing the fingers of a particular lock member to exacting tolerances. Moreover, the fingers can be periodically lapped on an abrasive surface if desired.

Another advantage of the present invention is that the spindle clamp has the tendency of being self-aligning. Even if the lock member is out of plane, as the lock member is drawn downwardly there is a tendency to distribute the loading pressure equally. The axial length of the downwardly-depending portion is sufficient that there is some spring deformation that aids in distributing the loading pressure. That is, bowing of the fingers aids in properly distributing clamping force since none of the fingers are left out of contact with the data disk as a result of other fingers making initial contact with the data disk. Equal clamping force is further facilitated by the number of fingers. Preferably there are twelve fingers, each finger being separated by a minimal distance. Even if there is a slight rotation of one or more fingers upon contact with a data disk, the number of contact points provided by the spider lock member is sufficient to prevent a "potato chip" effect in which two opposed sides of the inner periphery of the data disk are deformed upwardly while the other two opposed sides are deformed downwardly. Use of a spider lock member having sixty-four fingers is contemplated.

BRIEF DESCRIPTION OF THE DRAWINGS

FIG. 1 is a side sectional view of a spindle clamp in accord with the present invention, shown in a relaxed, disk-releasing position.

FIG. 2 is a side sectional view of the spindle clamp of FIG. 1 shown in a disk-clamping position.

FIG. 3 is a top view of a spider lock member of FIG. 1.

BEST MODE FOR CARRYING OUT THE INVENTION

With reference to FIGS. 1 and 2, a spindle clamp 10 includes a spider lock member 12 and a hub 14. The hub 14 is mounted to a spindle shaft 16 of a turntable for rotation about a central axis. Apertures 18 at the base of the hub receive bolts, not shown, that are threaded into internally-threaded holes 20, thereby securing the spindle shaft 16 for rotation about an axis defined by the spindle shaft.

As best seen in FIG. 1, the hub 14 has a midportion which defines a disk-seating surface 22. The disk-seating surface is immediately below a frustroconically-shaped upper portion 24 of the hub. The spider lock member 12 has a plurality of fingers 26 and the tip of each finger rests on a surface region of the frustroconically-shaped upper portion.

The top view of FIG. 3, shows that the fingers 26 are twelve in number and are equidistantly spaced from adjacent fingers by narrow slits 28. For clamping of a data disk having an inside diameter of 40 mm, for example, the slits 28 should be slightly less than 0.8 mm in width. The slits extend along the entirety of the fingers and into the upper region 30 of the spider lock member 12. The number of fingers is not critical, but should be within the range of 6-64, inclusive, to aid in proper distribution of loading force on a data disk. The lower limit of this range is the more important limit since a clamped data disk is more susceptible to warpage caused by a lock member having only a few fingers. Such warpage is referred to as a "potato chip effect" and resembles waves at the slits between fingers. However, by eliminating the slits 28 to provide a downwardly-depending portion having a continuous circumference, the "potato chip effect" is eliminated.

In the disk-releasing position of FIG. 1, the fingers 26 of the spider lock member 12 are vertical to define a generally cylindrical volume. The spider lock member 12 is fixed to a piston rod 32 by a shoulder screw or other means known in the art. Here, an externally threaded screw 34 is received within a bore 36 of the upper region 30 and within an internally threaded hole in the piston rod 32. The piston rod has an expanded lower end 38 which is snugly fit within a piston member 40. The piston rod 32 and the piston member 40 are acted upon by a circular reciprocating diaphragm 42 having an outer edge 44 fixed to the hub 14. Gas pressure upon the lower surface of the reciprocating diaphragm 42 maintains the piston member 40, and therefore the lock member 12, in the relaxed, disk-releasing position shown in FIG. 1. Pressurized gas, preferably air, is introduced into a volume 46 below the diaphragm via a gas passageway 48 in the spindle shaft 16. The force exerted by the pressurized air overcomes the bias of a helical spring 50 on the piston member 40 to maintain the lock member in the disk-clamping position of FIG. 1.

In operation, air is channeled through the gas passageway 48 into the volume 46 to press the piston member 40 upwardly. Axial movement of the piston member is translated to the spider lock member 12 by the piston rod 32. Thus, the lower tips of the lock member fingers 26 are held away from the disk-seating surface 22 of the hub 14. After placement of a data disk on the disk-seating surface 22, pressurized gas can be released from the volume 46 for the purpose of clamping the data disk to the hub. As shown in FIG. 2, a data disk 52 is rested upon the disk-seating surface of the hub 14. Upon release of pressurized gas from the volume 46, the force exerted by the helical spring 50 presses the piston member 40 downwardly. As the piston member moves axially downward the lock member follows, causing the tips of the fingers 26 to follow the shape of the upper portion 24 of the hub. The spider lock member 12 is made of an elastically deformable material which permits bending of the fingers 26 as the lock member 12 is moved axially. The release of pressurized gas continues until the tips of the fingers 26 are removed from the base of the frustroconically-shaped upper portion 24 and trap the data disk 52 against the disk-seating surface of the hub. In this manner, the data disk 52 is readied for rotation about a rotational axis defined by the spindle shaft 16.

Clamping of a data disk 52 is a "one-handed" process. The data disk is mechanically or manually placed on the disk-seating surface of the hub 14, whereafter the spindle clamp 10 itself applies pressure to lock the data disk in position. Because the spider lock member 12 is a unitary element, manufacture of the lock member reliably provides disk clamping with a properly distributed loading pressure. The locking member must be made of a deformable material having good memory. The slits 28 between adjacent fingers 26 are cut only after manufacture of the lock member 12. Thus, the fingers are of uniform length and provide a substantially uniform loading pressure.

Moreover, the structure of the spider lock member 12 is one which has a tendency toward being self-aligning. That is, even if the lock member becomes somewhat out of plane, as gas is evacuated from the volume 46 the lock member has a tendency to distribute the load. The fingers are of significant length to allow some spring deformation upon contact with the data disk 52, so that any misalignment of the lock member 12 does not cause certain fingers to remain spaced apart from the disk when in a disk-clamping position. In addition, the number and the size of the fingers promotes equal distribution of loading pressure even where some rotation of the fingers occurs.

Referring again to FIG. 1, the hub 14 is made of stainless steel. The frustroconically-shaped upper portion 24 of the hub preferably has a slope of 45 degrees relative to the vertical, but this is not critical. The inside diameter of the disk-seating surface 22 is slightly less than the inside diameter of a disk to be clamped. Disk diameters of 40 mm, 25 mm, and 20 mm are common.

As noted above, the spider lock member 12 is made of an elastically flexible material. For example, the material may be a strong engineering plastic of the acetal resin type. The piston rod 32 is a metallic member, and the piston member 40 is made of a nonparticulating material. The purpose of the diaphragm 42 is to make the assembly particulate-generation resistant despite the repeated introduction of gas into the volume 46. The diaphragm is made of an elastomer and is preferably urethane with a content of graphite.

The gas pressure exerted upon the diaphragm 42 from the volume 46 interacts with the bias of the helical spring 52 to define first and second equilibrium conditions. The first equilibrium condition defines the disk-releasing position of the spider lock member 12 shown in FIG. 1. In this position, the gas pressure is between 80 PSI and 100 PSI. In the disk-clamping position of FIG. 2, the gas pressure is approximately 20 PSI. The ideal loading pressure exerted by the fingers 26 is in the range of 20 PSI and 40 PSI.

While the present invention has been described with reference to pneumatic actuation of the spider lock member 12, actuation can also take place mechanically. Spindle clamps exist which include a push rod in place of the gas passageway 48. In such case, the push rod of the spindle shaft is mechanically coupled to a piston rod or the like which translates the vertical motion of the push rod to the lock member. Alternatively, the push rod may be fixed directly to the lock member. Moreover, it is recognized that the spindle clamp 10 is capable of securely clamping a data disk regardless of the orientation of the clamp, so that while the above operation of the spindle clamp has been described with the spindle clamp in an upright orientation, clamping occurs equally well when turned sideways or even upside down.

As noted previously, the slits 28 of the lock member 12 may be eliminated to provide a continuous circumferential surface. In such case, the choice of materials becomes more important since the lock member must be allowed to stretch as well as bend. Additionally, a material having a low coefficient of friction is preferred since such a lock member would likely be more susceptible to buckling as the lock member is moved downwardly along the surface of the hub. A lubricant may be used but must not be of the type which jeopardizes the data disk.

I claim:

1. A spindle clamp for removably supporting a disk having a central aperture comprising,
    a hub having a rotational axis and a disk-seating surface for supporting a disk perpendicular to said rotational axis, said hub having an inclined surface on a first side of said disk-seating surface, said inclined surface being inclined axially outwardly with approach to said disk-seating surface,
    a lock member having an axis generally coinciding with said rotational axis, said lock member having an axially-depending portion in contact with said inclined surface of said hub, said axially-depending portion having a free end, said free end being a terminus of said lock member, said axially-depending portion made of an elastically bendable material, said lock member having a relaxed, disk-releasing position wherein the radial extent of said free end is less than the radial extent of the central aperture of a disk, and
    means operatively coupled to said lock member for displacing along said rotational axis said lock member relative to said inclined surface and for selectively pressing said free end onto a disk to be supported on said disk-seating surface, displacement from said disk-releasing position towards said disk-seating surface causing radial expansion of said lock member at said free end to provide a disk-clamping position wherein said radial extent of the lock member exceeds the radial extent of said central aperture.

2. The spindle clamp of claim 1 wherein said lock member is a unitary member.

3. The spindle clamp of claim 1 wherein said axially-depending portion of said lock member is a plurality of spaced apart elongated fingers symmetrically arranged about said rotational axis to define a substantially cylindrical volume when in said disk-releasing position.

4. The spindle clamp of claim 1 further comprising means for biasing said lock member into one of said disk-releasing position and said disk-clamping position.

5. The spindle clamp of claim 4 wherein said biasing means is a spring operatively coupled to said lock member.

6. The spindle clamp of claim 1 wherein said inclined surface of said hub is a frustoconically-shaped bearing surface, said displacement of said locking member causing said free end of the lock member to slide along said bearing surface to change the radial extension of said lock member.

7. The spindle clamp of claim 1 wherein said displacing means includes a piston mounted to said lock member, said piston being pneumatically actuated.

8. The spindle claim of claim 3 wherein the number of said fingers is within the range of six to sixty-four, inclusive.

9. A spindle clamp for removably supporting a disk having a central aperture comprising,
    a hub having a rotational axis, said hub having a frustroconically-shaped upper portion and an annular disk-seating surface proximate to a base of said upper portion,
    a cup-shaped lock member mounted about said rotational axis and made of an elastically flexible material, said lock member located above said disk-seating surface, said lock member having a disk-releasing position wherein a lowermost end contacts said upper portion of said hub, said lock member having a disk-clamping position wherein said lowermost end is in position to exert force on an upper surface of a disk rested on said disk-seating surface, and
    means for biasing said lock member in one of said disk-releasing position and said disk-clamping position and for providing selective displacement of said lock member relative to said upper portion generally along said rotational axis.

10. The spindle clamp of claim 9 wherein said lock member is a unitary member having a plurality of downwardly-depending fingers, each finger having a free end in contact with said upper portion of the hub when said locking member is in said disk-releasing position.

11. The spindle clamp of claim 9 wherein said lock member has a radial extent less than the central aperture of said disk when said lock member is in said disk-releasing position.

12. The spindle clamp of claim 9 wherein said base of said upper portion of the hub has a diameter slightly less than the inside diameter of said disk.

13. The spindle clamp of claim 9 wherein said biasing means includes a spring.

14. The spindle clamp of claim 9 further including means for selectively displacing said lock member between said disk-releasing position and said disk-clamping position, said displacing means including a piston fixed to said lock member, said piston being disposed within said hub.

15. The spindle clamp of claim 14 wherein said displacing means further includes a flexible diaphragm fixed to said piston, reciprocating motion of said diaphragm causing said displacement.

16. A spindle clamp for removably supporting a disk having a central aperture comprising, a unitary lock member having a substantially circular central portion and a plurality of downwardly depending elongated fingers having tips at lower ends thereof, said lock member made of a resilient deformable material, said fingers having a relaxed, disk-releasing condition wherein said lock member has a maximum diameter less than the diameter of a central aperture of a disk, said fingers having a flexed, disk-clamping condition wherein said lock member has a maximum diameter exceeding said diameter of said central aperture, a hub having a frustroconically-shaped upper portion axially disposed below said lock member, said hub having a disk-seating surface at the base of said upper portion, and means for selectively displacing said lock member relative to said hub in a manner such that the tip of each finger follows the shape of said upper portion of the hub to contact a disk to be supported on said disk-seating surface, thereby causing said fingers to resiliently deflect between said disk-releasing condition and said disk-clamping condition.

17. The spindle clamp of claim 16 wherein said displacing means is a piston coupled to said lock member.

18. The spindle clamp of claim 16 wherein the number of said fingers is in the range of six to sixteen, inclusive.

19. The spindle clamp of claim 16 comprising means for biasing said lock member in a position to flex said fingers.

20. The spindle clamp of claim 16 wherein each downwardly depending finger is elongated and has an arcuate horizontal dimension such that said said lock member defines s substantially cylindrical volume when said fingers are in said disk-releasing condition.

* * * * *